Patented Mar. 23, 1948

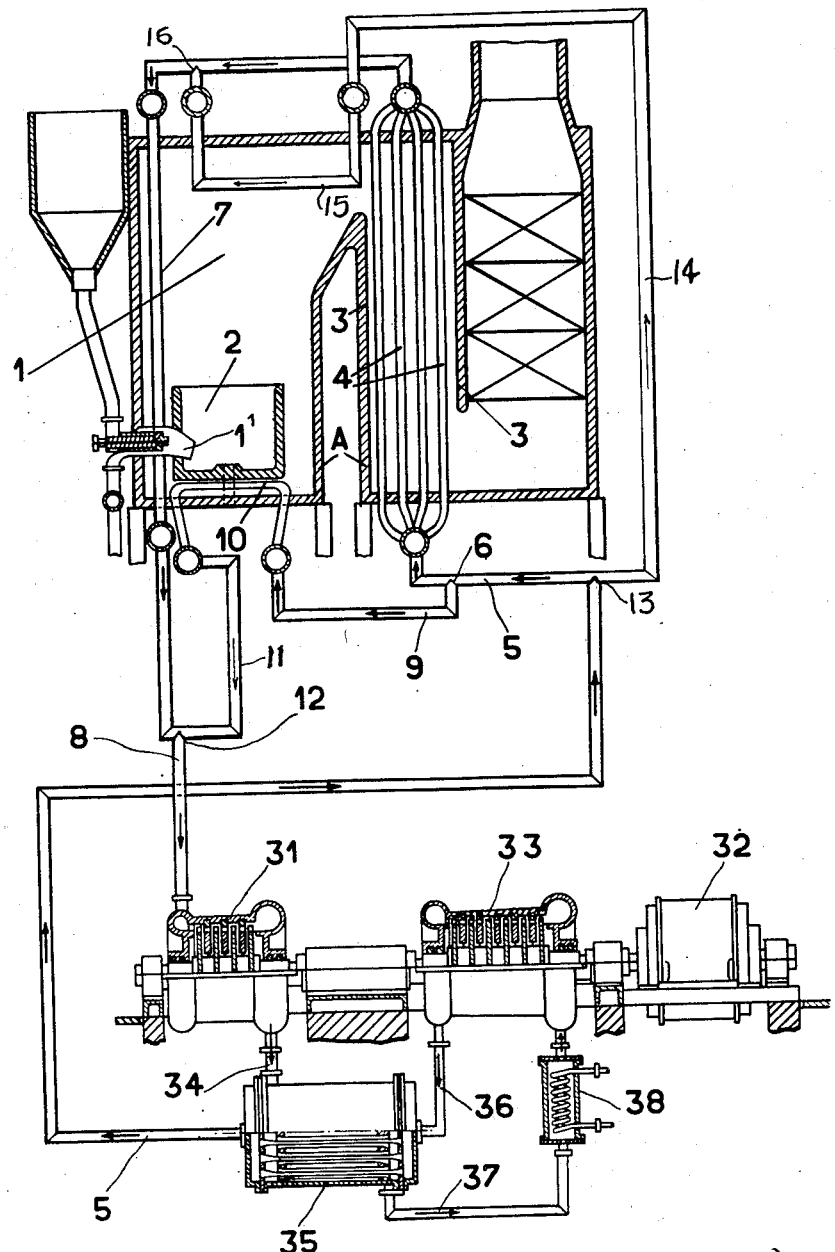

2,438,416

UNITED STATES PATENT OFFICE 2,438,416

PULVERIZED FUEL BURNING GAS HEATER

Rudolf Ruegg, Zurich, Switzerland, assignor to Aktiengesellschaft Fuer Technische Studien, Zurich, Switzerland, a corporation of Switzerland Application July 3, 1944, Serial No. 543,229
In Switzerland July 21, 1943

1 Claim. (Cl. 126—109)

This invention relates to a gas heater intended more especially for thermal power plants, in which at least the greater part of a gaseous working medium, preferably air, describes a circuit and has to be heated by a supply of heat from an external source. The object of the invention is to ensure the greatest possible reliability in operation and at the same time a good efficiency of the gas heater. For this purpose in a gas heater according to the present invention a part of the working medium to be heated effects cooling of at least one section of the heater where the stresses are particularly severe, said part flowing in parallel with the remaining main part of the working medium.

A preferred embodiment of the invention is illustrated by way of example and in a simplified mode of representation in the accompanying drawing, in which the single figure shows a gas heater with slag collecting receptacle, in which heater a part of the work medium to be heated effects cooling of the bottom of the slag collecting receptacle and other parts effect cooling of the ceiling and at least one side wall of the combustion chamber.

In the drawing the numeral 1 denotes the combustion chamber of an air heater A of a thermal power plant in which air describes a cycle and has to be heated by a supply of heat from an external source. The air heated in said heater A passes through a pipe 8 into a turbine 31 where it expands whilst giving up energy to a machine 32 which, for example, can take the form of an electric generator. The turbine 31 simultaneously drives a turbo-compressor 33. The expanded working medium issuing from the turbine 31 passes through a pipe 34 into a heat exchanger 35 of the counter-current type, where it gives up heat to the working medium that has been compressed by the compressor 33 and which flows through a pipe 36 from compressor 33 to this tubular heat exchanger 35. After having given up heat in the heat exchanger 35 the expanded working medium passes through a pipe 37 and a cooler 38 into the compressor 33, whilst the working medium of higher pressure which has taken up heat in the heat exchanger 35, passes through a pipe 5 into the heater A. The lower section of the combustion chamber 1 of this heater A is designed as a slag collecting receptacle 2. The reference 1¹ designates a burner supplied with pulverized fuel, and so related to the receptacle 2 that slag in the receptacle will be kept in a molten state so that it may be tapped off as circumstances may require. In a waste gas flue 3 arranged, when looking in the direction of flow of the combustion gases, beyond the combustion chamber 1 a tubular heating system 4 is installed. The air to be heated is supplied to this system 4 through the above mentioned pipe 5, a part of said air passing at point 6, which is situated, when looking in the direction of flow of the air, in front of the system 4, into a pipe 9. The greater part of the air supplied through pipe 5 passes, however, into the heating system 4 and then into a tubular heating system 7, which is arranged in the combustion chamber 1 in such a manner that the lower part of the tubes of this system 7 is disposed between the slag receptacle 2 and the inside face of the combustion chamber 1. The lower part of the system 7 is thus protected against excessive losses of heat towards the exterior. The air which has been brought to the required final temperature in the heating system 7 flows through pipe 8 into the turbine 31. The part of working medium which branches off at point 6 passes through pipe 9 into a system of tubes 10 located underneath the bottom of the slag receptacle 2, so that the air flowing through this system of tubes 10 effects cooling of the bottom of the slag receptacle. Since in doing so this air takes up heat, its temperature is raised simultaneously. The part of working medium heated in this manner passes into a pipe 11 and finally again mixes with the main current of working medium at point 12. The two currents of working medium to be heated in the heater A thus flow parallel to one another.

At a point 13 on the pipe 5, a pipe 14 is branched off and leads to a tubular system 15 which effects cooling of the ceiling of the combustion chamber 1. The medium heated in the system 15 returns to the main current of working medium at 16. It will be observed that the gaseous medium to be heated is heated on the once-through basis, and that the medium which does the protective cooling is not heated in the main portion 4 of the heater or any part thereof.

What is claimed is:

A once-through heater for gases comprising in combination means enclosing a combustion chamber and an offtake for products of combustion; a burner for burning pulverized fuel in said chamber at temperatures above the fusing point of non-combustible components of the fuel burned; a slag collecting receptacle associated with said chamber enclosing means; a heating system arranged in said offtake; a pipe connected to said heating system for supplying gaseous medium to be heated; a second heating system arranged in said combustion chamber; means connecting said two heating systems in series as to the flow of the medium to be heated; a pipe connected to said second heating system for carrying off the medium heated in said two heating systems; a heat exchanger connected to said supply pipe at a point upstream as to said first mentioned heating system and to said pipe for carrying off the heating medium at a point which is, when considered with reference to flow of said medium, beyond said second heating system and located to derive heat chiefly from and exercising a protective cooling effect upon the slag collecting receptacle; and a second surface heat exchanger located to derive heat directly from the ceiling of said combustion chamber and connected both to said supply pipe at a point upstream as to said first mentioned heating system and to said means connecting in series said two heating systems.

RUDOLF RUEGG.

REFERENCES CITED

The following references are of record in the file of this patent:

UNITED STATES PATENTS

| Number | Name | Date |
|---|---|---|
| 982,449 | Timmins | Jan. 24, 1911 |
| 1,986,951 | Vogel | Jan. 8, 1935 |
| 2,119,817 | Keller | July 7, 1938 |
| 2,166,199 | Shoemaker | July 18, 1939 |
| 2,174,663 | Keller | Oct. 3, 1939 |
| 2,224,544 | Keller | Dec. 10, 1940 |
| 2,380,169 | Gygi | July 10, 1945 |